US010250185B1

(12) United States Patent
Fang et al.

(10) Patent No.: US 10,250,185 B1
(45) Date of Patent: Apr. 2, 2019

(54) FUNCTIONALLY INTEGRATED DETACHABLE PHOTOVOLTAIC MODULE JUNCTION BOX

(71) Applicant: JIANGSU ENMAGIC ENERGY CO., LTD., Wuxi (CN)

(72) Inventors: Zheng Fang, Wuxi (CN); Jian Zuo, Wuxi (CN); Jian-Bin Tong, Wuxi (CN); Ke Wang, Wuxi (CN)

(73) Assignee: Jiangsu Enmagic Energy Co., Ltd., Jiangsu (CN)

( * ) Notice: Subject to any disclaimer, the term of this patent is extended or adjusted under 35 U.S.C. 154(b) by 0 days.

(21) Appl. No.: 15/837,141

(22) Filed: Dec. 11, 2017

(30) Foreign Application Priority Data

Oct. 25, 2017 (CN) .................... 2017 2 1385537 U (51) Int. Cl.
| | |
|---|---|
| *H05K 5/02* | (2006.01) |
| *H02S 40/34* | (2014.01) |
| *H02G 3/14* | (2006.01) |
| *H02G 3/03* | (2006.01) |
| *H02S 50/00* | (2014.01) |
| *H02G 3/08* | (2006.01) |

(52) U.S. Cl.
CPC ............. *H02S 40/345* (2014.12); *H02G 3/03* (2013.01); *H02G 3/083* (2013.01); *H02G 3/14* (2013.01); *H02S 50/00* (2013.01)

(58) Field of Classification Search
None
See application file for complete search history.

(56) References Cited

U.S. PATENT DOCUMENTS

| | | | | |
|---|---|---|---|---|
| 8,177,566 | B2* | 5/2012 | Boensch | H01R 9/2425 439/135 |
| 9,077,092 | B2* | 7/2015 | Kraemer | H01R 4/4809 |
| 9,701,335 | B2* | 7/2017 | Hagiwara | B62D 5/0406 |
| 10,044,184 | B1* | 8/2018 | You | H02S 50/00 |
| 2005/0231897 | A1* | 10/2005 | Yamashita | B60R 16/0238 361/600 |
| 2008/0180884 | A1* | 7/2008 | Parrish | B60R 16/0238 361/624 |
| 2010/0039781 | A1* | 2/2010 | Tai | H01R 4/4818 361/752 |

(Continued)

*Primary Examiner* — Courtney L Smith
(74) *Attorney, Agent, or Firm* — Rosenberg Klein & Lee (57) ABSTRACT

A functionally integrated detachable photovoltaic module junction box has a base part and an upper cover part. The base part has string ports and two power supply ports. The string port electrically connects to strings on a photovoltaic module. The upper cover part has a circuit board therein. The circuit board has an optimizing and monitoring circuit and multiple electrical connection pieces connected to the optimizing and monitoring circuit. The electrical connection pieces are detachably connected to the string ports and the power supply port on the base part, for the optimizing and monitoring circuit to perform such functions as component optimization, monitoring, communication and shutdown on the photovoltaic module. Use of the junction box reduces the production, assembly and maintenance costs. When the junction box requires maintenance, only the upper cover part is needed to be replaced, thereby quickly completing the repair.

20 Claims, 9 Drawing Sheets

(56) References Cited

U.S. PATENT DOCUMENTS

| | | | |
|---|---|---|---|
| 2010/0216336 A1* | 8/2010 | Quiter | H01R 4/4809 439/567 |
| 2010/0218802 A1* | 9/2010 | Quiter | H01R 4/4827 136/244 |
| 2012/0055529 A1* | 3/2012 | Hung | H01L 31/02021 136/244 |
| 2012/0122336 A1* | 5/2012 | Eusterholz | H01L 31/02013 439/502 |
| 2012/0324808 A1* | 12/2012 | Reyal | H01L 31/02008 52/173.3 |

* cited by examiner

FUNCTIONALLY INTEGRATED DETACHABLE PHOTOVOLTAIC MODULE JUNCTION BOX

BACKGROUND OF THE INVENTION

1. Field of the Invention

The invention relates to a photovoltaic module junction box and, in particular, to a detachable photovoltaic module junction box that integrates functions of component optimization, monitoring, communication and shutdown.

2. Description of Related Art

With the rise of green energy, photovoltaic (PV) power generation receives more and more attention on the market. With technological developments, PV systems that can provide the maximum power generation efficiency are more welcomed by the market.

Owing to limitations in production processes, there are subtle differences among power generation units. Constrained by the cost and the current level of electrical and electronic components manufacturing, it is impossible to achieve an overall optimization of the power plant level in power optimization.

With developments in the technology, power optimization is gradually pushed toward smaller power generation units. Currently, group serial power optimization is most likely to achieve. Also as time goes on, the market has posed more demanding requirements for PV power generation systems, as listed below.

Optimization: power optimization is required at the level of the smallest power generation unit in order to have the maximum power output. When the devices are blocked by tree branches and weeds, have inconsistent orientations, or mismatched components, it is still designed to have its maximum power output.

Monitoring: such parameters as voltage, current and temperature, of the power generation unit are measured at maximum precision.

Communication: reliable communications are achieved within the ISM band, with a minimal frequency band and radio wave interference, while resistant to surrounding radio interference; Shutdown: the output of the module can be shut down automatically or remotely, thereby protecting the safety of the module and the surrounding components.

Production: the product production cycle is shortened as much as possible, thereby reducing space occupancy.

Maintenance: difficulties in repair and maintenance are reduced so that problems can be solved once and for all.

Cost: more functions can be integrated while the cost is reduced.

From the above description, it is seen that the market currently imposes a lot of requirements on the PV power generation system, such as the specification, performance and cost. However, related products on the market at the moment emphasize more on power optimization. Nothing of integration type has appeared to integrate various functions in a single module to reduce production, assembly and maintenance costs.

SUMMARY OF THE INVENTION

It is an objective of the invention to provide a functionally integrated detachable PV module junction box. Functions of group serial optimization, monitoring, communication and shutdown are integrated to a single device to meet market requirements. At the same time, a detachable structure is employed to increase the efficiencies in production, assembly and maintenance, thereby relatively reducing the costs.

To achieve the objective, the functionally integrated detachable PV module junction box includes a base part and an upper cover part that electrically and detachably connects to the base part.

The base part has a base in which a plurality of string ports, a positive electrical port, and a negative electric port are provided.

The upper cover part has an upper cover provided with a circuit board therein. The circuit board has an optimizing and monitoring circuit and a plurality of electrical connection pieces that electrically connect to the optimizing and monitoring circuit. Each of the electrical connection pieces matches with a respective one of the string ports, the positive electrical port, and the negative electrical port on the base part for connections.

The base part is applied to be mounted on a PV module. Each of the string ports, the positive electrical port, and negative electrical port electrically connect to the strings of the PV module. When the upper cover part and the base part are connected, each of the electrical connection pieces of the upper cover part correspondingly match with the string ports, the positive electrical port and the negative electrical port and form electrical connections. As a result, the optimizing and monitoring circuit of the upper cover part connects to the strings of the PV module via the electrical connection pieces, thereby performing power optimization and performance monitoring on each of the strings. When an abnormal activity happens, the optimizing and monitoring circuit sends out a notification and shuts down the corresponding string.

Since the optimizing and monitoring circuit that has various processing functions is integrated on the circuit board of the upper cover part, the functions of power optimization, monitoring, communications and shutdown are all integrated on the junction box, thereby satisfying function requirements of PV power generation products by the market. Moreover, the base part is mounted on the PV module. The upper cover part is detachably combined with the base part to increase the assembly efficiency and reducing the assembly cost. On the other hand, when the junction box needs to be repaired, only the upper cover part of the junction box needs to be replaced. This quickly completes the repair and reduces the maintenance cost.

DETAILED DESCRIPTION OF THE PREFERRED EMBODIMENT

Figure 1:
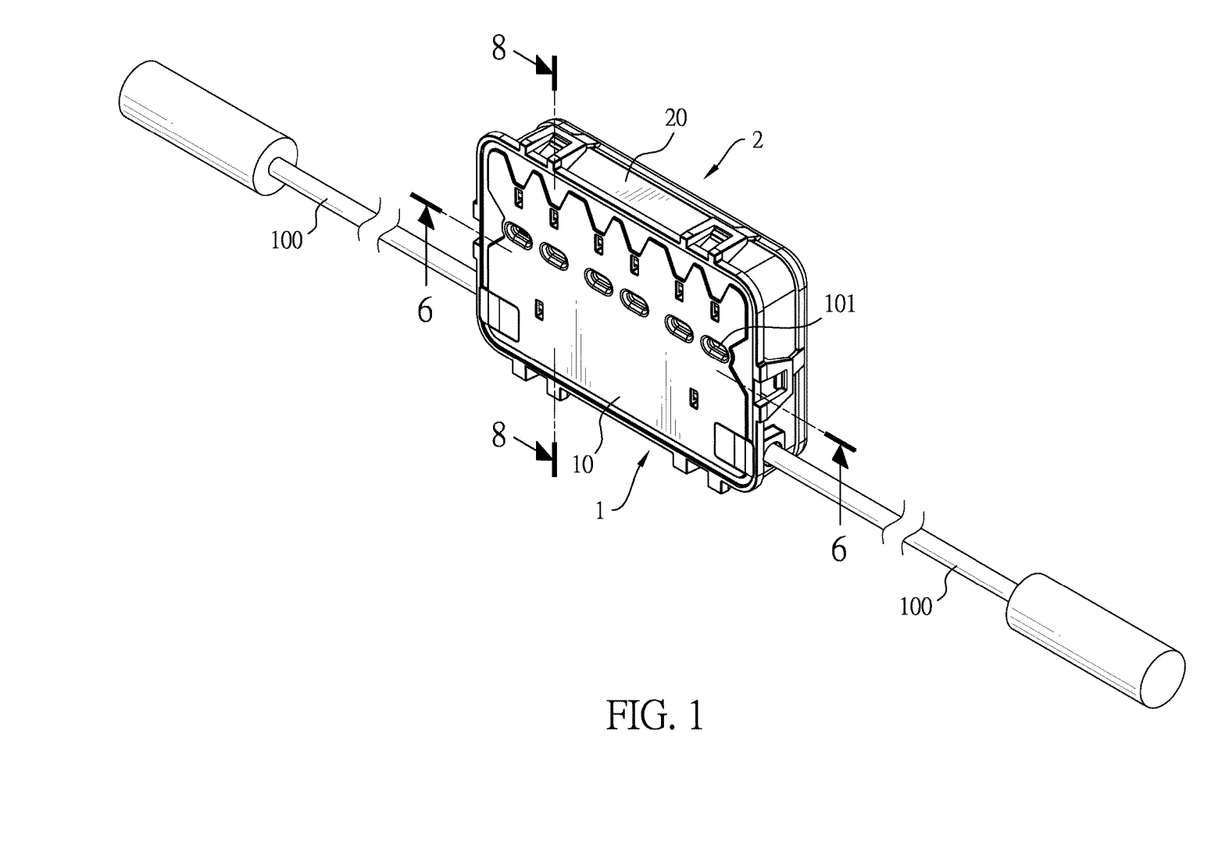
FIG. 1 shows a perspective view of a junction box of the invention.

As shown in FIG. 1, a junction box in a PV module comprises a base part 1 and an upper cover part 2 that is detachably mounted on the base part 1. The base part 1 has a base 10 and a plurality of through holes 101 formed on a bottom of the base 10 for copper belts to go through. The copper belts electrically connect to strings of the PV module. Both sides of the base 10 are provided respectively with a cable 100 for serial connections of the junction boxes of adjacent PV modules.

Figure 2:
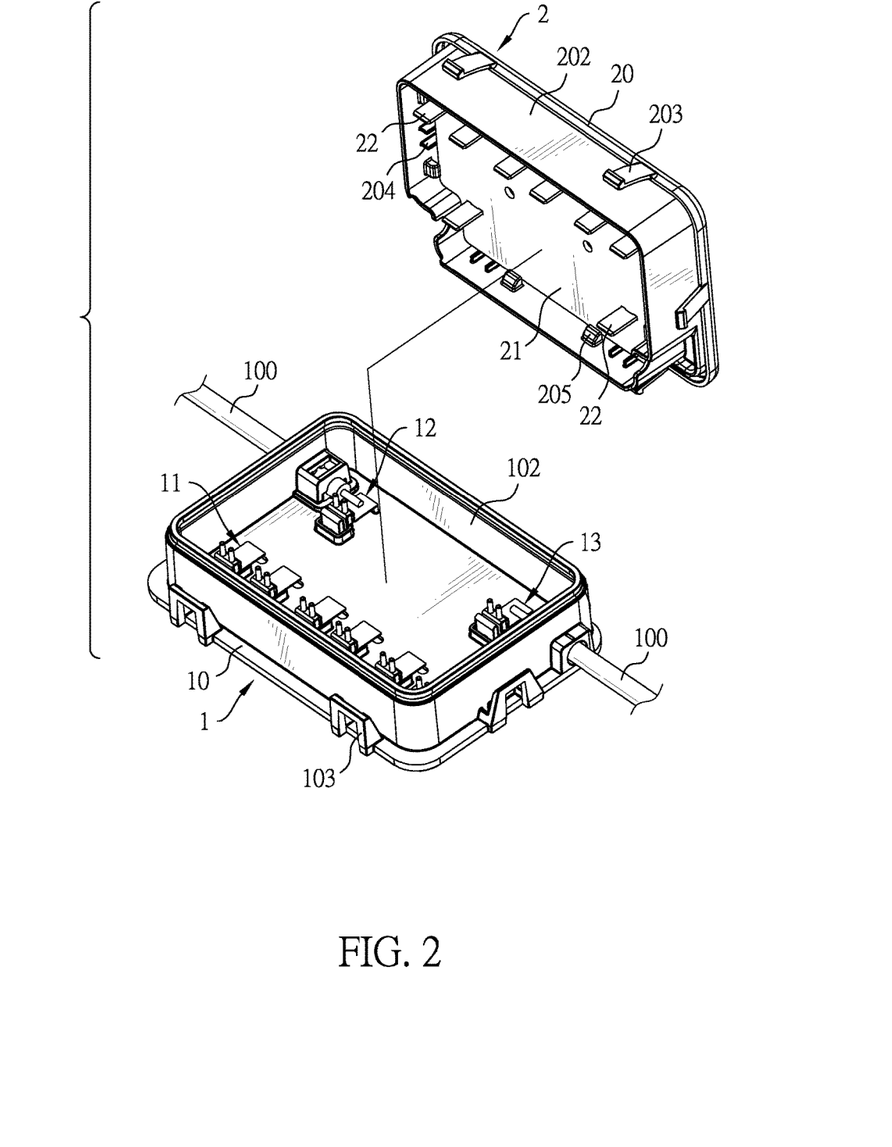
FIG. 2 is an exploded perspective view showing a base part and an upper cover part of the junction box.

As shown in FIG. 2, a lower wall 102 is formed around the bottom of the base 10. A plurality of string ports 11, a positive electrical port 12, and a negative electrical port 13 are provided inside the lower wall 102. The positive electrical port 12 and the negative electrical port 13 electrically connect to the two cables 100, respectively. A plurality of buckles 103 are provided outside the lower wall 102 on the bottom of the base 10 for the connection with the upper cover part 2. In this embodiment, each buckle 103 is in an inverted U shape.

The upper cover part 2 has an upper cover 20. The upper cover 20 has a top, around which an upper wall 202 is formed. The space formed within the top and the upper wall 202 is provided with a circuit board 21. The circuit board 21 is provided with a plurality of electrical connection pieces 22 and an optimizing and monitoring circuit (not shown). The electrical connection pieces 22 match with the string ports 11, the positive electrical port 12 and the negative electrical port 13 on the base 10, thereby forming electrical connections through insertions. The top of the upper cover 20 is provided with a plurality of engaging blocks 203 outside the upper wall 202. Each of the engaging blocks 203 corresponds to a respective buckle 103 on the base 10, thereby achieving a detachable connection.

Figure 3:
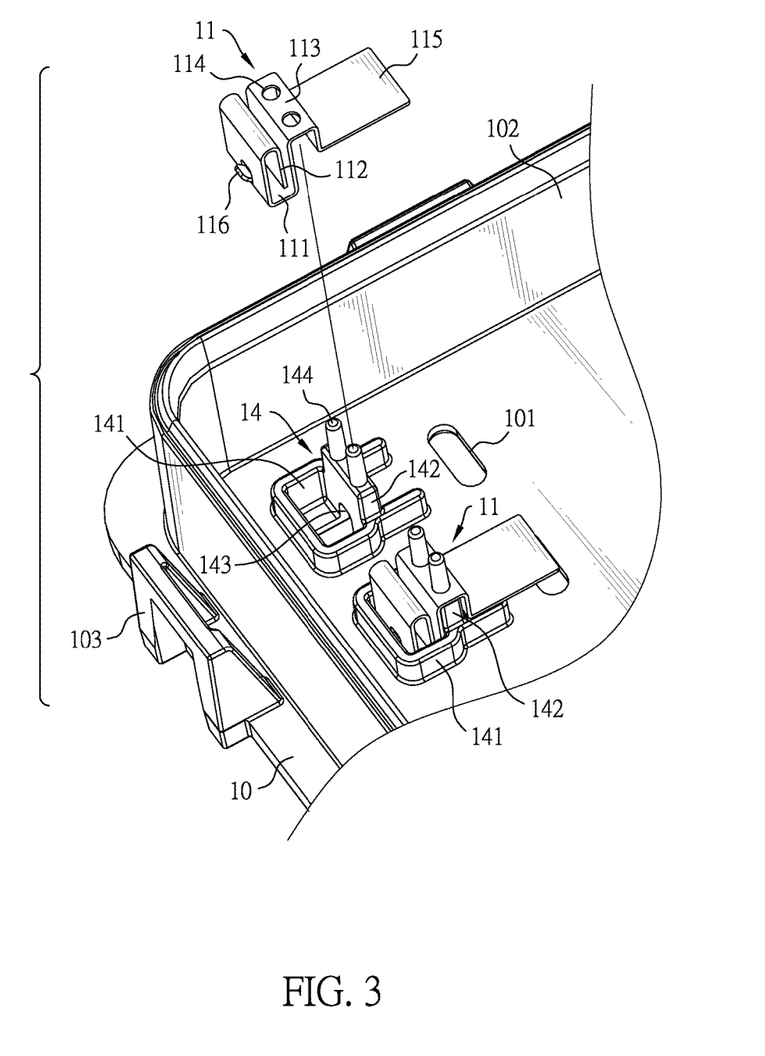
FIG. 3 is a locally exploded view of the base part of the invention.

FIG. 3 shows the structures of the string ports 11, the positive electrical port 12, and the negative electrical port 13 inside the base 10. Moreover, the string ports 11, the positive electrical port 12, and the negative electrical port 13 have the same structure. In the following, one of the string ports 11 is taken as an explicit example to describe in detail the structure thereof.

Figure 4:
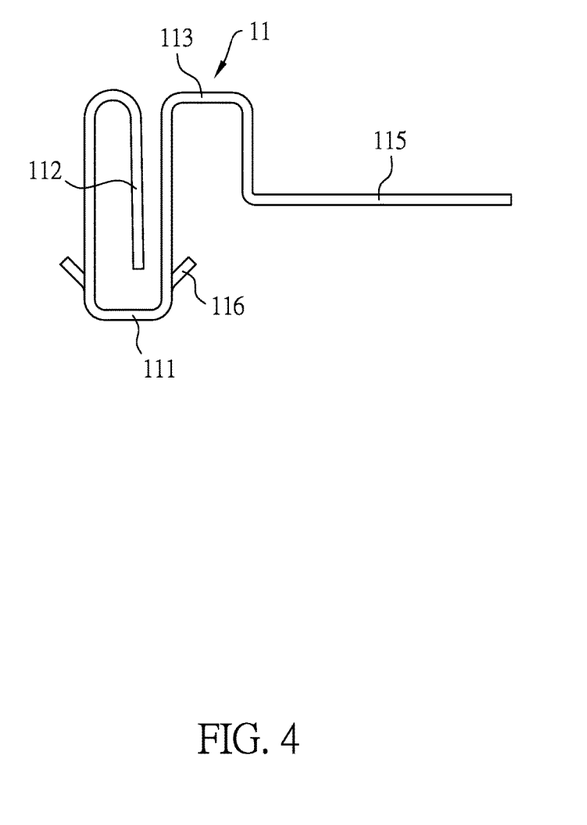
FIG. 4 is a planar view of a string port of the base part of the invention.

With reference simultaneously to FIGS. 3 and 4, the string port 11 is formed by bending a conductive metal sheet, with one end forming a U-shaped inserting part 111. The inserting part 111 has two pinnacles, with one pinnacle extending toward the interior of the inserting part 111 to form a contact spring 112 and the other pinnacle extending horizontally to form a saddle part 113. The saddle part 113 is formed with two fixing holes 114. Besides, the saddle part 113 is formed with an L-shaped electrical connection part 115 on the end opposite to the inserting part 111. That is, the inserting part 111 and the electrical connection part 115 are on opposite ends of the saddle part 113. The electrical connection part 115 corresponds to the through holes 101 on the base 10 for being soldered on the copper belts passing through the through holes 101. The inserting part 111 allows the electrical connection pieces 22 of the upper cover part 1 to be inserted in between. Each electrical connection piece 22 is in electrical contact with one side wall of a corresponding inserting part 111 and the contact spring 112. The opposite outer sidewalls of the inserting part 111 are punched to form a protruding piece 116 to reinforce fixing effects.

In order to more firmly combine the string ports 11, the positive electrical port 12 and the negative electrical port 13, the inner surface of the bottom of the base 10 is formed with a plurality of installation platforms 14. Each of the installation platforms 14 comprises a concave accommodation chamber 141 and a wall part 142 protruding from one edge of the accommodation chamber 141. The accommodation chamber 141 accommodates the inserting parts 111 of the string ports 11. Two side walls of the accommodation chamber 141 are formed with concave grooves 143. The two grooves 143 correspond to the protruding pieces 116 on the two opposite outer sidewalls of the inserting part 111. The protruding pieces 116 are inserted to enhance the fixing effect.

The wall part 142 is formed with two protruding pillars 144. The saddle part 113 of the string port 11 strides across the wall part 142. The protruding pillars 144 of the wall part 142 protrude through the fixing holes 114 on the saddle part 113, thereby firmly fixing the string port 11 on the installation platform 14. As described before, the structure of the positive electrical port 12 and the negative electrical port 13 are the same as that of the string port 11. The base 10 is also formed with the same installation platform 14 to fix the positive electrical port 12 and the negative electrical port 13.

Figure 5:
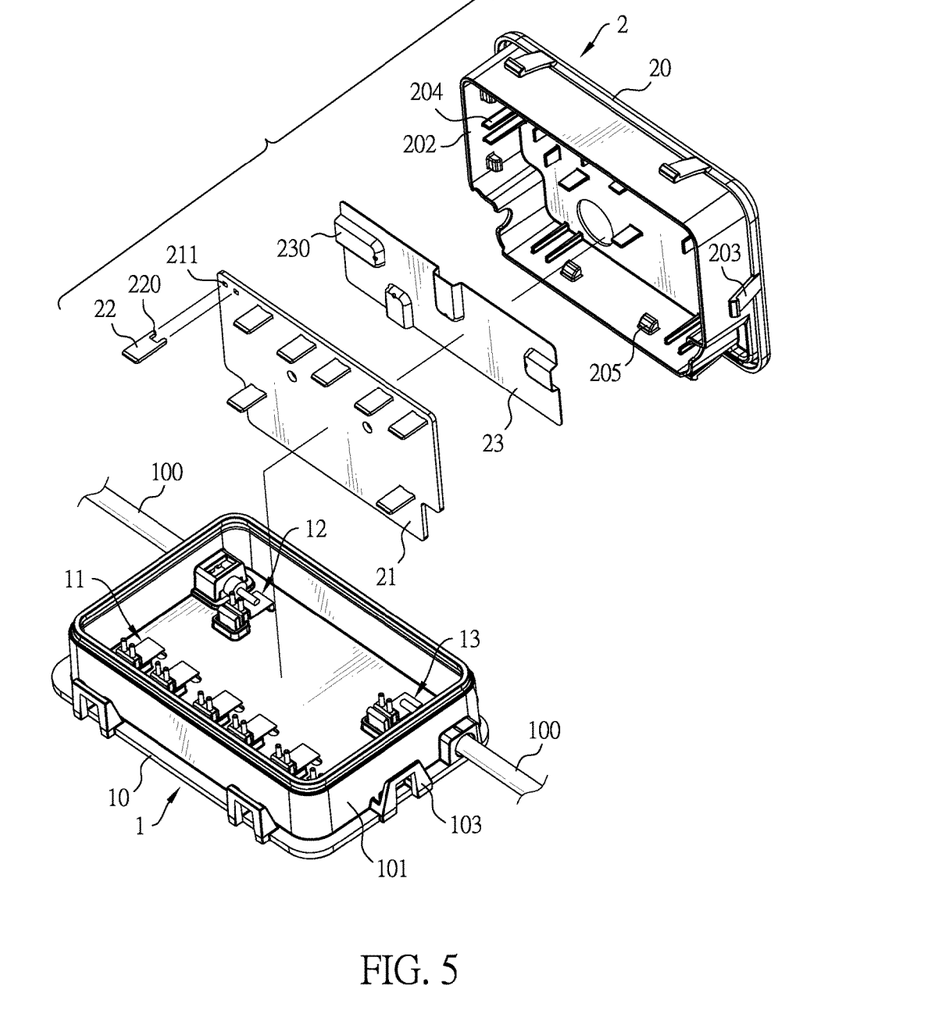
FIG. 5 is an exploded view of the upper cover part of the invention.

As shown in FIG. 5, the inner surface of the upper wall 202 of the upper cover 20 is formed with a plurality of limiting sheets 204 and a plurality of limiting blocks 205. The circuit board 21 is disposed within the limiting sheets 204 inside the upper wall 202, supported by the limiting blocks 205 to maintain a height over the upper wall 202.

The circuit board 21 is formed with a plurality of sets of paired conductive holes 211 in order to have electrical connections with pins 220 protruding from the bottom end of the electrical connection pieces 22. Each of the conductive holes 211 is connected to the optimizing and monitoring circuit provided on the circuit board 21. When the upper cover part 20 and the base part 10 are connected, and the electrical connection pieces 22 are respectively connected to the string ports 11, the positive electrical port 12, and the negative electrical port 13 on the base 10, the optimizing and monitoring circuit on the circuit board 21 performs power optimization on the strings that are connected to the string ports 11, the positive electrical port 12, and the negative electrical port 13. Parameters such as voltage and temperature of the PV module are monitored. When any parameter is abnormal, a notification is sent out and the strings are shut down automatically or remotely.

Figure 6:
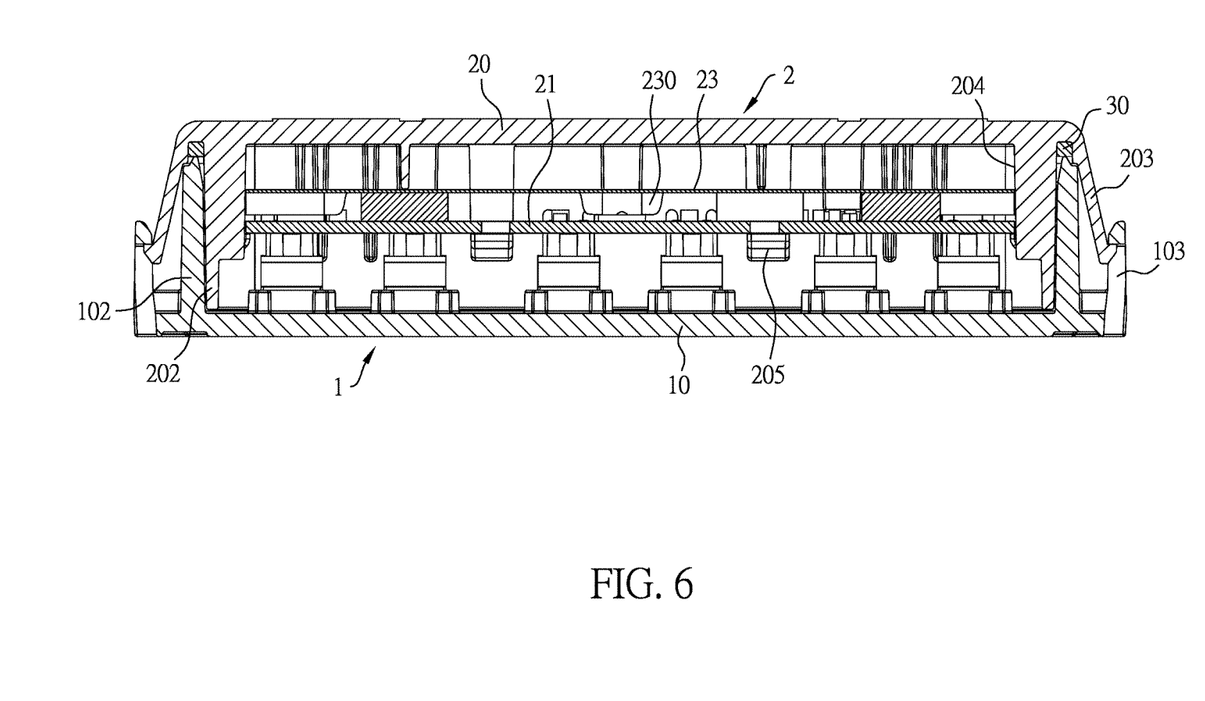
FIG. 6 is a cross-sectional view of the invention.

When the optimizing and monitoring circuit provided on the circuit board 21 performs power optimization, monitoring, and communications, it may generate a high temperature. To ensure that the operation of the optimizing and monitoring circuit is not affected by the high temperature, the upper cover 20 in this embodiment is further provided with a heat sink 23. As shown in FIG. 5, the heat sink 23 is formed with a plurality of protruding parts 230, each of which is close to primary elements (such as MCU) on the optimizing and monitoring circuit of the circuit board 21 for heat dissipation. In this embodiment, the upper cover 20 is further injected with a glue with high thermal conductivity, thereby firmly fixing the circuit board 21 and the heat sink 23 therein. The highly thermal conductive glue also helps heat dissipation. In addition, it is resistant to water and dusts. As shown in FIG. 6, a waterproof ring 40 is inserted between the upper cover 20 and the base 10 so that the junction box has better water resistance.

Figure 7A:
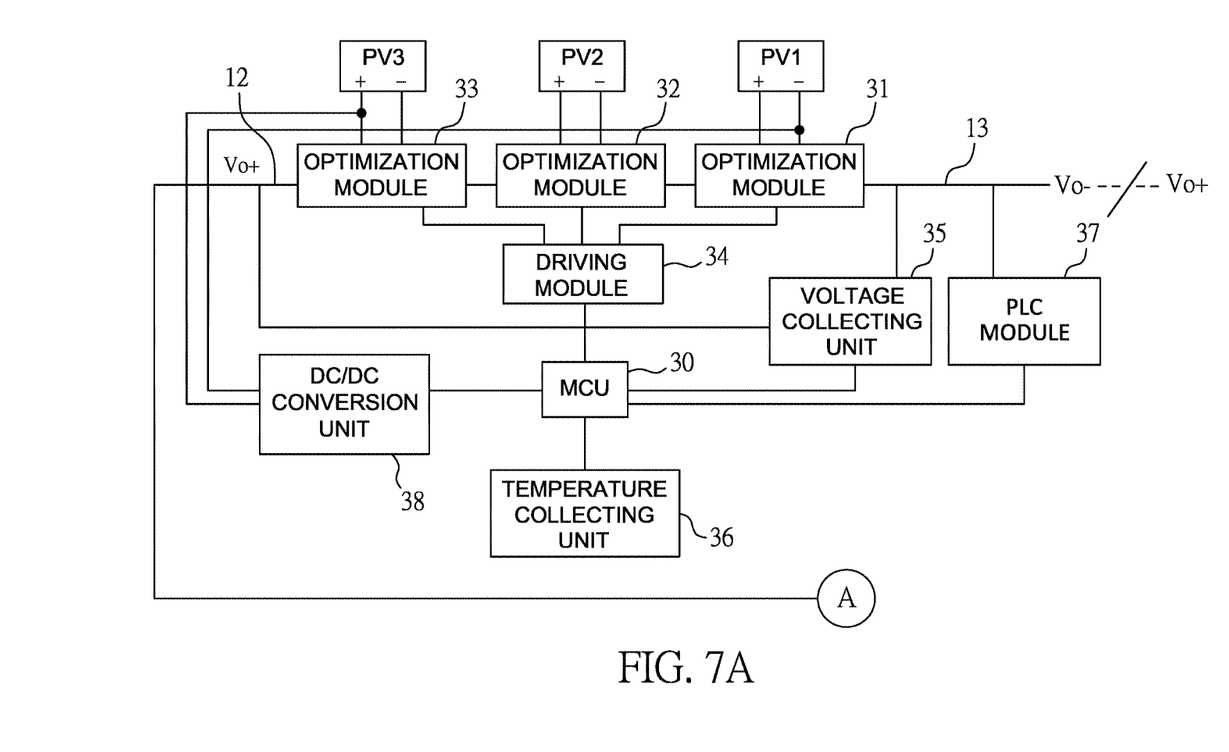
FIGS. 7A and 7B are block diagrams of an optimizing and monitoring circuit.
Figure 7B:
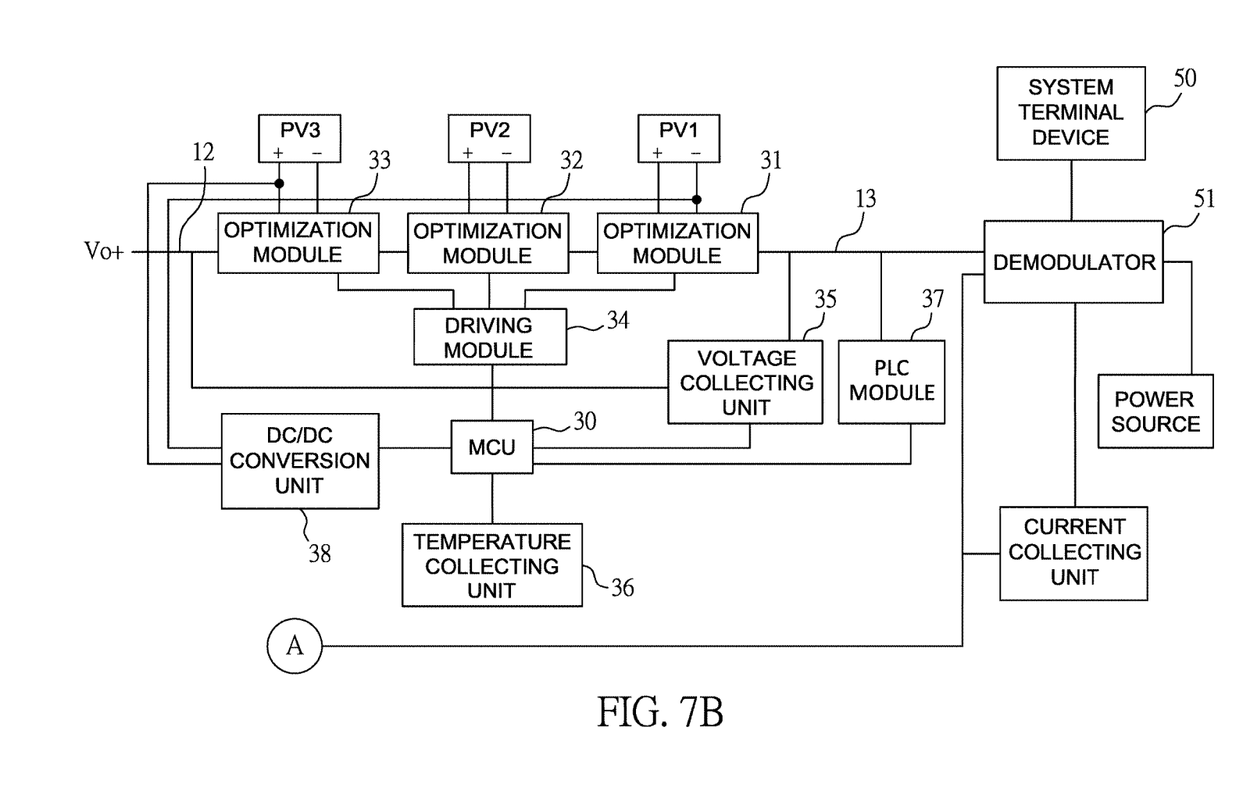

The structure of the optimizing and monitoring circuit on the circuit board 21 is shown in FIGS. 7A and 7B. The optimizing and monitoring circuit inside a single junction box comprises a micro control unit 30, a plurality of optimization modules 31~33, a driving module 34, a voltage collecting unit 35, a temperature collecting unit 36, and a power line communication (PLC) module 37.

The optimization modules 31~33 connect respectively to the power input terminals of the strings PV1, PV2, and PV3 of the PV module. More explicitly, the optimization modules 31~33 electrically connect to the string ports 11, the positive electrical port 12, and the negative electrical port 13 on the base part 1 via the electrical connection pieces 22 on the circuit board 21, thereby connecting to the power output terminals of PV1, PV2, and PV3. The optimization modules 31~33 perform maximum power point tracking (MPPT) on each of the strings PV1, PV2, and PV3. This achieves the goal of power optimization at the smallest power generation unit (string level).

The voltage collecting unit 35 has a set of input terminals and an output terminal. The input terminals are connected to a positive power source VO+ and a negative power source VO− of the PV module via the positive electrical port 12 and the negative electrical port 13, thereby detecting the voltage of the PV module. The output terminal of the voltage collecting unit 35 is connected to the micro control unit 30 to transmit the detected voltage to the micro control unit 30.

The temperature collecting unit 36 collects an environmental temperature of the optimizing and monitoring circuit, and transmits the detected environmental temperature to the connected micro control unit 30.

The PLC module 37 is a power line communication device connected to power loops of the micro control unit 30 and the PV module. Therefore, the micro control unit 30 communicates with an external system terminal device 50 via power lines.

In addition to the above-mentioned functions of power optimization, monitoring, and communications, the invention further provides a shutdown function. Each of the optimization modules 3133 has a shutdown end EN, which is connected to the output terminal of the driving module 34. The input terminal of the driving module 34 is connected with the micro control unit 30. When the micro control unit 30 determines that the PV module or any of the strings is abnormal, in addition to sending a notification via the PLC module 37 to the system terminal device 50, the micro control unit 30 can automatically send a command or accept a command from the system terminal device to shut down any one or all of the strings via the driving module 34. The abnormal strings are isolated from the power loop to protect the system safety of other normal strings of the PV module or other PV modules.

The power supplied to the junction box and the optimizing and monitoring circuit comes from the power output from the PV module without the need of any additional power supply systems. That is, the optimizing and monitoring circuit further includes a DC/DC conversion unit 38, whose input terminal is connected to the power output terminal of the PV module via the electrical connection pieces 22 and the string ports 11. Therefore, the DC/DC conversion unit 38 performs DC to DC voltage conversion on the power output from the PV module, thereby supplying a stable working voltage to the micro control unit 30. Since each of the strings PV1~PV3 of the PV module are connected in series via the optimization modules 31~33, the input terminal of the DC/DC conversion unit 38 then connects to the positive power output terminal of the string PV3 and the negative power output terminal of the string PV1 via the electrical connection pieces 22 and the string ports 11, thereby obtaining electrical power from the PV module.

Through the above-mentioned junction box, each of the PV modules can be connected in series. Each of the PV modules can also make use of the junction box to have power optimization, monitoring, and shutdown functions. The optimizing and monitoring circuit of each junction box communicates with the system terminal device 50 via power lines. The system terminal device 50 connects to the power lines via a demodulator 51 in order to demodulate carrier waves on the power line to the system terminal device 50.

The explicit structure of the invention is described above. The following describes how to use the invention.

Figure 8:
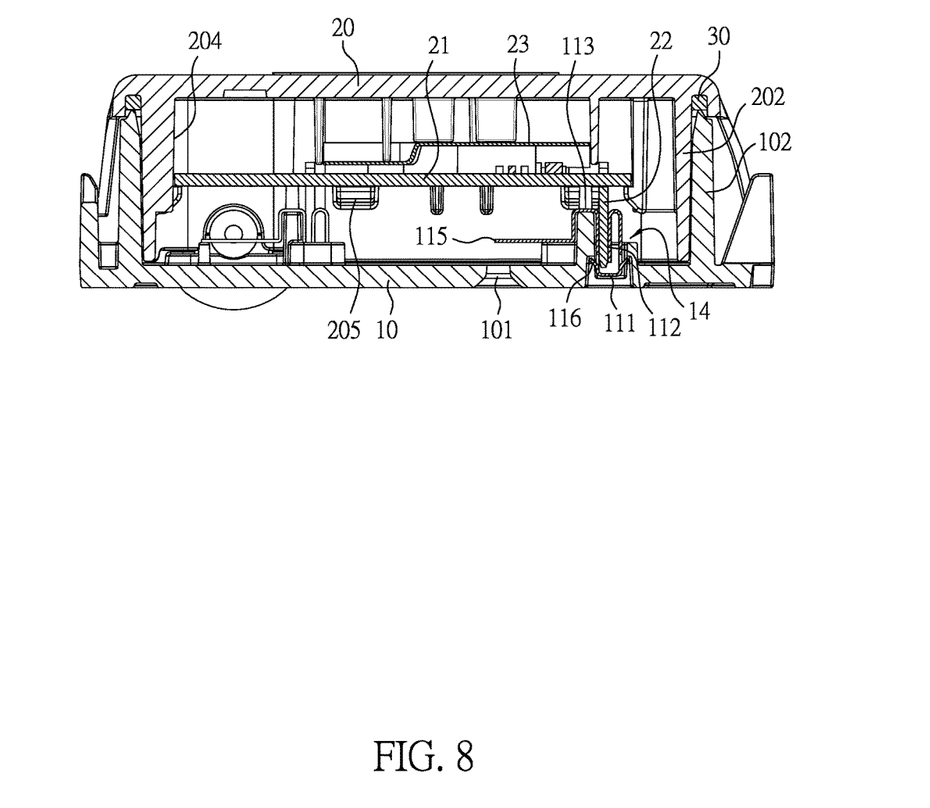
FIG. 8 is another cross-sectional view of the invention.

As shown in FIGS. 6 and 8, the upper cover part 2 is detachably connected to the base part 1. The upper cover 20 of the upper cover part 2 is provided with a circuit board 21 with the optimizing and monitoring circuit to perform optimization, communications, monitoring and shutdown functions. Through the detachable electrical connections between the electrical connection pieces 22 and the string ports 11, the positive electrical port 12, and the negative electrical port 13, the junction box is easier to assemble. When the junction box requires maintenance, one merely takes off the upper cover part 2 and replaces it with a new upper cover part 2, making the repair quick and easy. Use of the power lines for communications can reduce the costs of wiring and materials. This also reduces difficulty in assembly.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A functionally integrated detachable photovoltaic (PV) module junction box, comprising a base part and an upper cover part connected to the base part in a detachable way to establish an electrical connection; wherein
   the base part includes a base provided with a plurality of string ports, a positive electrical port, and a negative electrical port; and
   the upper cover part includes an upper cover provided with a circuit board therein, the circuit board is provided with an optimizing and monitoring circuit, a plurality of electrical connection pieces electrically connected to the optimizing and monitoring circuit, and each of the electrical connection pieces matches a respective one of the string ports, the positive electrical port, and the negative electrical port on the base for corresponding insertion.

2. The functionally integrated detachable PV module junction box of claim 1, wherein:
   the base of the base part has a bottom formed with a plurality of through holes;
   a lower wall is formed around the bottom of the base and provided with the string ports, the positive electrical port and the negative electrical port therein;
   a plurality of buckles are provided outside the lower wall of the bottom of the base for connection to the upper cover part;
   the upper cover of the upper cover part has a top and an upper wall formed around the top, with a space defined by the top and the upper wall being provided with the circuit board; and
   a plurality of engaging blocks are provided outside the upper wall of the top of the upper cover, with each of the engaging blocks corresponding to a respective one of the buckles on the base.

3. The functionally integrated detachable PV module junction box of claim 2, wherein:
   each of the string ports, the positive electrical port, and the negative electrical port is formed by bending a conductive metal sheet, with one end forming a U-shaped inserting part that has two pinnacles, one of the two pinnacles extending toward interior of the inserting part to form a contact spring and the other pinnacle extending horizontally to form a saddle part, and the saddle part is formed with an electrical connection part on the end opposite to the inserting part; and an inner surface of the bottom of the base is formed with a plurality of installation platforms, each of the installation platforms includes a concave accommodation chamber and a wall part protruding from one edge of the accommodation chamber, and the saddle part strides across the wall part.

4. The functionally integrated detachable PV module junction box of claim 3, wherein:

the wall part of each of the installation platforms is formed with two protruding pillars; and the saddle part is formed with two fixing holes for the protruding pillars of the wall part to go through, respectively.

5. The functionally integrated detachable PV module junction box of claim 2, wherein an inner surface of the upper wall on the upper cover is formed with a plurality of limiting pieces and a plurality of limiting blocks, the circuit board is disposed within the limiting pieces of the upper wall and supported by the limiting blocks to maintain a height on the upper wall.

6. The functionally integrated detachable PV module junction box of claim 2, wherein the upper cover is provided with a heat sink on an inner side of the circuit board, the heat sink is formed with a plurality of protruding parts, and each of the protruding parts is close to the optimizing and monitoring circuit on the circuit board.

7. The functionally integrated detachable PV module junction box of claim 2, wherein the upper cover is provided with thermally conductive glue to fix the circuit board and the heat sink therein.

8. The functionally integrated detachable PV module junction box of claim 2, wherein the circuit board is formed with a plurality of sets of paired conductive holes, each of which is connected to the optimizing and monitoring circuit on the circuit board; and the each of the electrical connection pieces has two pins to be correspondingly inserted into the conductive holes on the circuit board.

9. The functionally integrated detachable PV module junction box of claim 1, wherein the optimizing and monitoring circuit includes:
a micro control unit;
a plurality of optimization modules; and
a driving module, a voltage collecting unit, a temperature collecting unit, and a power line communication (PLC) module connected to the micro control unit;

the optimization modules electrically connect to the electrical connection pieces, respectively;

each of the optimization modules has a shutdown end connected to an output terminal of the driving module; and an input terminal of the driving module connects to the micro control unit.

10. The functionally integrated detachable PV module junction box of claim 2, wherein the optimizing and monitoring circuit includes:
a micro control unit;
a plurality of optimization modules; and
a driving module, a voltage collecting unit, a temperature collecting unit, and a power line communication (PLC) module connected to the micro control unit;

the optimization modules electrically connect to the electrical connection pieces, respectively;

each of the optimization modules has a shutdown end connected to an output terminal of the driving module; and an input terminal of the driving module connects to the micro control unit.

11. The functionally integrated detachable PV module junction box of claim 3, wherein the optimizing and monitoring circuit includes:
a micro control unit;
a plurality of optimization modules; and
a driving module, a voltage collecting unit, a temperature collecting unit, and a power line communication (PLC) module connected to the micro control unit;

the optimization modules electrically connect to the electrical connection pieces, respectively;

each of the optimization modules has a shutdown end connected to an output terminal of the driving module; and an input terminal of the driving module connects to the micro control unit.

12. The functionally integrated detachable PV module junction box of claim 4, wherein the optimizing and monitoring circuit includes:
a micro control unit;
a plurality of optimization modules; and
a driving module, a voltage collecting unit, a temperature collecting unit, and a power line communication (PLC) module connected to the micro control unit;

the optimization modules electrically connect to the electrical connection pieces, respectively;

each of the optimization modules has a shutdown end connected to an output terminal of the driving module; and an input terminal of the driving module connects to the micro control unit.

13. The functionally integrated detachable PV module junction box of claim 5, wherein the optimizing and monitoring circuit includes:
a micro control unit;
a plurality of optimization modules; and
a driving module, a voltage collecting unit, a temperature collecting unit, and a power line communication (PLC) module connected to the micro control unit;

the optimization modules electrically connect to the electrical connection pieces, respectively;

each of the optimization modules has a shutdown end connected to an output terminal of the driving module; and an input terminal of the driving module connects to the micro control unit.

14. The functionally integrated detachable PV module junction box of claim 6, wherein the optimizing and monitoring circuit includes:
a micro control unit;
a plurality of optimization modules; and
a driving module, a voltage collecting unit, a temperature collecting unit, and a power line communication (PLC) module connected to the micro control unit;

the optimization modules electrically connect to the electrical connection pieces, respectively;

each of the optimization modules has a shutdown end connected to an output terminal of the driving module; and an input terminal of the driving module connects to the micro control unit.

15. The functionally integrated detachable PV module junction box of claim 7, wherein
the optimizing and monitoring circuit includes:
a micro control unit;
a plurality of optimization modules; and
a driving module, a voltage collecting unit, a temperature collecting unit, and a power line communication (PLC) module connected to the micro control unit;
the optimization modules electrically connect to the electrical connection pieces, respectively;
each of the optimization modules has a shutdown end connected to an output terminal of the driving module; and
an input terminal of the driving module connects to the micro control unit.

16. The functionally integrated detachable PV module junction box of claim 8, wherein
the optimizing and monitoring circuit includes:
a micro control unit;
a plurality of optimization modules; and
a driving module, a voltage collecting unit, a temperature collecting unit, and a power line communication (PLC) module connected to the micro control unit;
the optimization modules electrically connect to the electrical connection pieces, respectively;
each of the optimization modules has a shutdown end connected to an output terminal of the driving module; and
an input terminal of the driving module connects to the micro control unit.

17. The functionally integrated detachable PV module junction box of claim 9, wherein the optimizing and monitoring circuit includes a DC/DC conversion unit that has an input terminal connected to the corresponding electrical connection piece, and an output terminal connected to the micro control unit.

18. The functionally integrated detachable PV module junction box of claim 10, wherein the optimizing and monitoring circuit includes a DC/DC conversion unit that has an input terminal connected to the corresponding electrical connection piece, and an output terminal connected to the micro control unit.

19. The functionally integrated detachable PV module junction box of claim 11, wherein the optimizing and monitoring circuit includes a DC/DC conversion unit that has an input terminal connected to the corresponding electrical connection piece, and an output terminal connected to the micro control unit.

20. The functionally integrated detachable PV module junction box of claim 12, wherein the optimizing and monitoring circuit includes a DC/DC conversion unit that has an input terminal connected to the corresponding electrical connection piece, and an output terminal connected to the micro control unit.

* * * * *